Patented Dec. 1, 1931                                                  1,834,280

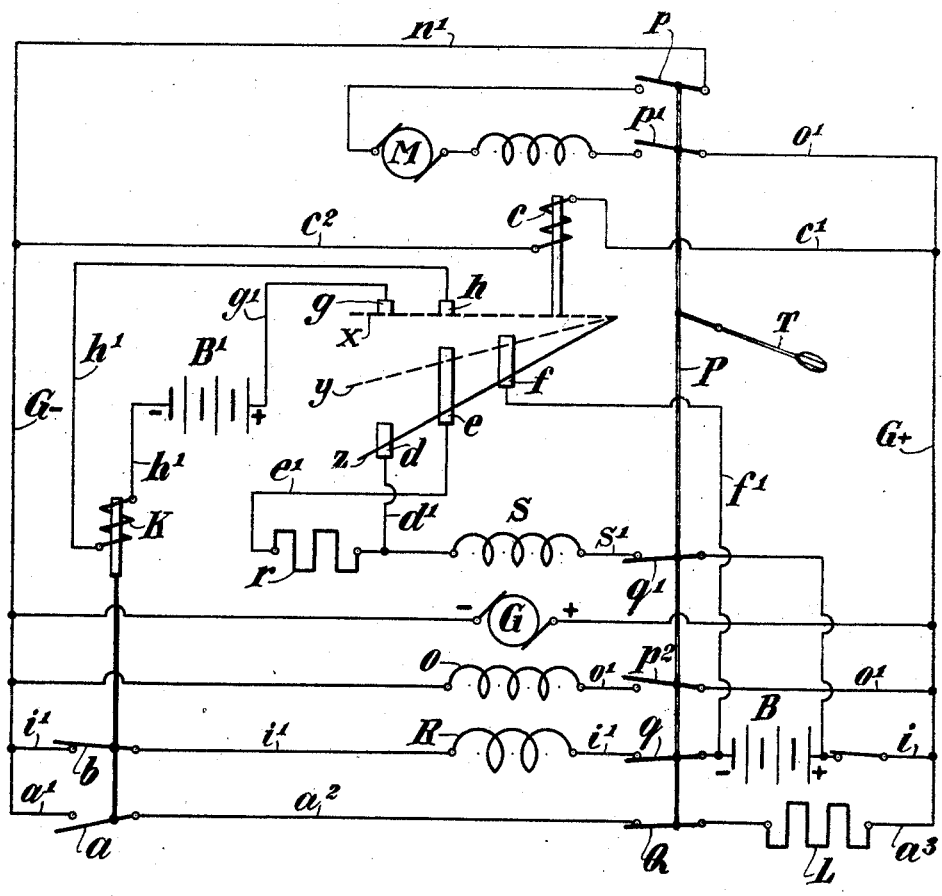

UNITED STATES PATENT OFFICE

WILLIAM B. JUPP, OF NEW YORK, N. Y., AND FRANK E. QUEENEY, OF TEANECK, NEW JERSEY, ASSIGNORS TO INTERNATIONAL MOTOR COMPANY, OF NEW YORK, N. Y., A CORPORATION OF DELAWARE

GENERATOR CONTROL FOR BATTERY CHARGING

Application filed November 24, 1928. Serial No. 321,645.

The present invention relates to the control of a generator used in rail car service where it is driven by an internal combustion engine and supplies current to the driving motors and lights, as well as charges the storage battery used on the car. This application is a continuation in part of the application of William B. Jupp and Frank E. Queeney, Serial No. 194,992, filed May 28, 1927 for Generator control for battery charging.

Where the engine speed is constantly changing and the main generator output varies continually, the charging of the storage battery has been accomplished heretofore by supplying a separate generator for such purpose. An object of the present invention is to provide a means of charging the 32 volt battery directly from the main 600 volt generator and maintain conditions such that no over-charging of the battery results and other deleterious effects on the system are avoided.

More specifically the invention relates to a system for charging a 32 volt storage battery directly from the main 600 volt generator which is provided with auxiliary fields to be used in place of the main fields when the generator is rotated at a speed equivalent to the idling speed of an internal combustion engine. A suitable over-voltage relay is provided to disconnect the generator when the battery voltage due to excess charging, reaches a predetermined maximum value, thus preventing injury to the lamps of the battery circuit. When the generator is disconnected, a resistance is inserted across its terminals by a suitable contactor and, in this manner, excess speed of the engine is prevented when the battery load is removed, resulting in no surge voltage when the load circuit is again closed.

Reference will now be had to the accompanying drawing for a more detailed description of the invention wherein the single figure represents, diagrammatically, the wiring whereby the main generator is connected and disconnected under appropriate battery voltage conditions, and an auxiliary resistance is inserted across the generator.

In the accompanying figure, G represents the armature of the main 600 volt generator for use on rail cars or other vehicles, to supply current to the driving motors, S the auxiliary shunt field winding for generating a reduced, or charging voltage, and R the auxiliary differential series field winding which co-operates with field S. Wire $s'$ connects the shunt field of the generator to a battery B. A resistance $r$ is adapted to be inserted in series with the shunt field winding by an over-voltage relay O. V. R., the coil $c$ of which is connected directly across the terminals of the generator by wires $c'$ and $c^2$. The over-voltage relay O. V. R. has three back contacts $d$, $e$ and $f$, contact $d$ being connected to the shunt field winding S through wire $d'$, contact $e$ being connected to the resistance $r$ through wire $e'$ and contact $f$ to the battery and armature through wires $f'$ and $i'$. Front contacts $g$ and $h$ of the over-voltage relay O. V. R. are connected to a contactor coil K and a battery B' by wires $h'$ and $g'$, respectively. The contact arm of the over-voltage relay has three positions, viz, front, as indicated at $x$, intermediate, as indicated at $y$, and back, as indicated at $z$.

The storage battery B is connected to one side of the generator by wire $i$ and to the other side by wire $i'$. The contactor coil K, when energized, operates contact arms $a$ and $b$, to cause the former to close its contact and the latter to open its contact. Closing $a$ inserts a load resistance L across the armature of the generator G through wires $a'$, $a^2$ and $a^3$. Arm $b$ is connected in the circuit of wire $i'$ to disconnect the battery B when coil K is energized.

The main 600 volt shunt field is shown at O and is connected across the armature of the generator G by wire $o'$. The driving motor is indicated at M and connected to the generator through wires $n'$ and $o'$. Switch contacts $p$ and $p'$ connect the motor across the generator and contact $p^2$ connects the shunt field $o$ in circuit with the generator through wire $o'$. These contacts are connected together through operating rod P.

Switch contacts $q$ and $q'$ are connected in the circuits represented by wires $i'$ and $s'$, respectively, and, when open, disconnect the battery and auxiliary series and shunt fields R and S, from the generator. Contacts $q$ and $q'$ are operated by rod P in such manner than when $q$ and $q'$ are closed, contacts $p$, $p'$ and $p^2$ are open. It is evident that, in practice, this can be done electrically, but in order that the drawing be simplified this interlock is shown as mechanical and embodies a pivoted lever T to which rod P is connected.

The operation of the device is as follows: Assuming the battery voltage to be within a desired range, the overvoltage relay is in the position indicated at $z$ and the battery is being charged. Under these conditions the generator G is charging battery B as a differential compound generator since contactor K is in the down position and arm $b$ maintains the battery circuit closed. If, due to excess charging, the battery voltage rises above the maximum permissible value, the coil $c$ is sufficiently energized to operate the relay and in moving to position $x$, the arm of the relay passes off of contact $d$ and engages only contacts $e$ and $f$. This condition is shown in dotted lines at $y$ and results in resistance R being inserted in the shunt field circuit to cut down the generator voltage.

The main 600 volt shunt field cannot be connected to the generator while the 32 volt auxiliary fields are connected and the load resistance L is automatically disconnected when the 600 volt field is connected.

In the front position $x$, contacts $g$ and $h$ are closed, completing the circuit of coil $k$ across battery B'. This results in the closing of contact $a$ and opening of contact $b$, due to the energization of K. As described above, the simultaneous opening and closing of these two respective contacts disconnects the battery and inserts a load across the armature of the generator to prevent the speed of the engine from increasing due to the dropping of its load. Thus when the over-voltage relay again closes, there is no surge voltage, due to high engine speed, to injure the lamps.

From the above description it will be apparent that the invention may be used in any form of vehicle where a current is generated by the engine to drive the motors and the specific form and manner of connecting the elements may be varied without departing from the scope of the appended claims.

What we claim is:

1. In combination with a generator having a high voltage field and a low voltage field winding adapted to be used selectively one at a time, a storage battery, a load resistance, means to connect the battery and low voltage field to the generator to charge the battery, and means to disconnect the field and battery and simultaneously connect the resistance across the generator.

2. In combination with a generator having a high voltage field and a low voltage field winding adapted to be used selectively one at time, a storage battery, means to connect the battery and low voltage field to the generator to charge the battery, means to disconnect the field and battery, and means operated by the disconnecting means for preventing the speed of the generator from increasing when the battery is disconnected.

3. In combination with a generator having a high voltage field and a low voltage field winding adapted to be used selectively one at a time, a storage battery, a load resistance, means to connect the battery and low voltage field to the generator to charge the battery, an over voltage relay operable upon a predetermined battery voltage, means operated when the relay operates to disconnect the battery and auxiliary field, and means operated simultaneously to insert the load resistance across the armature of the generator.

This specification signed this 13th day of Nov., A. D. 1928.

WILLIAM B. JUPP.
FRANK E. QUEENEY.